United States Patent
Pfeifle et al.

(10) Patent No.: US 10,451,429 B2
(45) Date of Patent: Oct. 22, 2019

(54) GENERALIZATION FACTOR BASED GENERATION OF NAVIGATION DATA

(71) Applicant: HERE Global B.V., Eindhoven (NL)

(72) Inventors: Martin Pfeifle, Seewald (DE); Yong Gessner, Stuttgart (DE); Aurélien His, Kelkheim (DE)

(73) Assignee: HERE Global B.V., Eindhoven (NL)

( * ) Notice: Subject to any disclaimer, the term of this patent is extended or adjusted under 35 U.S.C. 154(b) by 148 days.

(21) Appl. No.: 15/667,874

(22) Filed: Aug. 3, 2017

(65) Prior Publication Data
US 2018/0038707 A1 Feb. 8, 2018

Related U.S. Application Data

(60) Provisional application No. 62/370,800, filed on Aug. 4, 2016.

(51) Int. Cl.
*G01C 21/36* (2006.01)
*G01C 21/32* (2006.01)
*G08G 1/0968* (2006.01)
*G08G 1/01* (2006.01)

(52) U.S. Cl.
CPC .............. *G01C 21/36* (2013.01); *G01C 21/32* (2013.01); *G08G 1/012* (2013.01); *G08G 1/0112* (2013.01); *G08G 1/0129* (2013.01); *G08G 1/0141* (2013.01); *G08G 1/0968* (2013.01)

(58) Field of Classification Search
CPC ...... G01C 21/36; G01C 21/32; G08G 1/0968; G08G 1/0141; G08G 1/012; G08G 1/0129; G08G 1/0112
See application file for complete search history.

(56) References Cited

U.S. PATENT DOCUMENTS

| | | | |
|---|---|---|---|
| 7,920,964 B2 * | 4/2011 | Nomura | G01C 21/3611 340/988 |
| 9,057,624 B2 | 6/2015 | Malahy et al. | |
| 9,613,120 B1 * | 4/2017 | Kharatishvili | G06F 16/2358 |
| 9,710,505 B1 * | 7/2017 | McAlister | G06F 16/2228 |
| 2008/0086264 A1 | 4/2008 | Fisher | |
| 2009/0024656 A1 * | 1/2009 | Wellman | G06F 16/258 |
| 2009/0037441 A1 | 2/2009 | Howell et al. | |
| 2009/0248758 A1 * | 10/2009 | Sawai | G01C 21/32 |

(Continued)

OTHER PUBLICATIONS

Douglas-Peucker Algorithmus—Wikipedia [online] [retrieved Sep. 27, 2017]. Retrieved from the Internet: <URL:https://de.wikipedia.org/wiki/Douglas-Peucker-Algorithmus>. 3 pages.

(Continued)

*Primary Examiner* — Mussa A Shaawat
(74) *Attorney, Agent, or Firm* — Alston & Bird LLP

(57) ABSTRACT

A method is disclosed comprising: determining, using a processor, a generalization factor associated with a data element of a database comprising navigation data, the generalization factor depending on a usage information associated with the data element, wherein the generalization factor is indicative to a level of details of a new data element to be generated based on the data element. Further disclosed are a corresponding apparatus, a corresponding system and a corresponding computer readable storage medium.

20 Claims, 4 Drawing Sheets

(56) References Cited

U.S. PATENT DOCUMENTS

| | | | |
|---|---|---|---|
| 2010/0017108 A1* | 1/2010 | Nakamura | G01C 21/32 701/532 |
| 2010/0131198 A1* | 5/2010 | Chang | G01C 21/30 701/533 |
| 2010/0299055 A1* | 11/2010 | Hilbrandie | G01C 21/32 701/532 |
| 2010/0318291 A1* | 12/2010 | Gluck | G01C 21/367 701/532 |
| 2011/0106431 A1* | 5/2011 | Tomobe | G01C 21/32 701/533 |
| 2013/0035853 A1 | 2/2013 | Stout et al. | |
| 2013/0096829 A1* | 4/2013 | Kato | G01C 21/32 701/533 |
| 2013/0328937 A1 | 12/2013 | Pirwani et al. | |
| 2015/0211881 A1 | 7/2015 | Stauber | |
| 2015/0260532 A1* | 9/2015 | Sanio | G01C 21/32 701/533 |
| 2016/0061615 A1* | 3/2016 | Takahata | G01C 21/32 701/532 |
| 2017/0219357 A1* | 8/2017 | Pfeifle | G01C 21/28 |

OTHER PUBLICATIONS

Toward Web Mapping With Vector Data [online] [retrieved Sep. 27, 2017]. Retrieved from the Internet: <URL:http://www.ahahah.eu/data/doc/gisscience2012_gaffuri_draft.pdf>. 14 pages.

* cited by examiner

10,451,429 B2

GENERALIZATION FACTOR BASED GENERATION OF NAVIGATION DATA

CROSS REFERENCE TO RELATED APPLICATION

This application claims priority to U.S. Provisional Application No. 62/370,800, filed Aug. 4, 2016, the entire contents of which are incorporated herein by reference.

FIELD

The following disclosure relates to the field of navigation, or more particularly relates to systems, apparatuses, and methods for generating navigation data.

BACKGROUND

Navigation data, for instance a map that shall be used by a terminal, such as for instance a hand-held navigation device or a car-mounted navigation device or the like may nowadays being stored locally at the terminal. Due to storing the navigation data locally, there may be, for instance, several limits regarding the size of the locally stored navigation data. The navigation data may contain data for different zooming levels resulting in an increased size of the navigation data.

To prevent the locally stored navigation data from becoming outdated, there may be provided incremental updates of the navigation data to the terminal, for instance by update patches. Very often, the size of the navigation data correlates to the incremental update patch size required for updating the navigation data locally stored at the terminal.

Transmission of the navigation data and/or the incremental update patches to the terminal may require relatively lots of bandwidth and/or transmission time in addition to the required memory for storing such data locally at the terminal.

It is an object of the invention to reduce the size of the navigation data locally stored at such aforementioned terminals and to reduce the size of update patches needed for preventing the locally stored navigation data from becoming outdated.

SUMMARY

According to a first exemplary embodiment, a method is disclosed, the method comprising:
  determining, using a processor, a generalization factor associated with a data element of a database comprising navigation data, the generalization factor depending on a usage information associated with the data element, wherein the generalization factor is indicative of a level of details of a new data element to be generated based on the data element.

This method may for instance be performed and/or controlled by an apparatus, for instance a server. Alternatively, this method may be performed and/or controlled by more than one apparatus, for instance a server cloud comprising at least two servers.

According to a further exemplary aspect of the invention, a computer program is disclosed, the computer program when executed by a processor causing an apparatus, for instance a server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:
an apparatus according to any aspect of the invention as disclosed above, and a terminal, wherein the terminal is configured to receive at least one of a generated new data element.

In the following, exemplary features and exemplary embodiments of all aspects of the present invention will be described in further detail.

By determining a generalization factor associated with a data element of a database comprising navigation data, and the generalization factor depending on a usage information associated with the data element, wherein the generalization factor is indicative to a level of details of a new data element to be generated based on the data element, the level of details of a new data element to be generated can be varied. For each new data element to be generated, the level of details of said new data element can be controlled depending on the usage information associated with the data element.

A new data element to be generated may comprise a certain level of details, wherein the level of details of said new data element can be controlled by the generalization factor used in generating the new data element. A new data element may represent a modified data element, wherein the new data element is at least partially modified based on the generalization factor. Thus, a new data element may be generated, wherein it is at least partially modified compared to the data element, based on which is new data element is generated. The generalization factor is at least dependent on the usage information associated with the data element.

According to an exemplary embodiment of all aspects of the invention, a higher generalization factor results in generating the new data element with a relatively higher level of details.

The highest level of details possible of said new data element to be generated may equal the level of details contained in the data element, based on which the new data element is to be generated. Data elements generated with a higher generalization factor may lead to a larger size, compared to data elements generated with a lower generalization factor. The larger size may result from a higher level of details of the new data element to be generated. A new data element to be generated may be of smaller size when generated with a relatively lower generalization factor.

By the possibility to vary the level of details of a new data element, each new data element to be generated can contain an individual level of details.

According to an exemplary embodiment of all aspects of the invention, the usage information is determined based on data associated with the data element, wherein the data element represents at least one map region.

A data element represents at least one map region so that a plurality of data elements may represent a plurality of at least one map regions, which may form a map. Thus, a data element may be part of a plurality of data elements. For instance, said determining a generalization factor associated with a data element of a database comprising navigation data may be performed for at least one data element or each data element of the plurality of data elements. A border of at least one map region of a data element may be connected to a border of at least one further map region of a different data element. This may ensure that no duplicate information of a data element representing at least one map region or duplicate information of a part of at least one map region of a data element may be contained in the navigation data forming a map.

It is understood that further navigation data forming a map may comprise a plurality of new data elements to be generated, wherein at least two different generalization factors are associated with at least two different new data elements of the plurality of new data elements. Further, there may be a plurality of maps, wherein each map of the plurality of maps is associated with a different level of details. In a further example, each data element of a map of said plurality of maps may be associated with a different level of details.

In a further exemplary embodiment of all aspects of the aforementioned embodiments, said data associated with the data element represents data being indicative of a likelihood of usage of the data element.

Usage information, as used herein, may represent a value indicating an expected usage of a data element by at least one user. The usage information may therefore represent a value associated with said data element. A higher value of usage information may lead to a relatively higher generalization factor compared to a lower usage information value, which will lead to a relatively lower generalization factor compared to a higher value of usage information due to the dependency of the generalization factor to the usage information. Or, at another example, a lower value of usage information may lead to a relatively lower generalization factor compared to a higher usage information value, which will lead to a relatively higher generalization factor compared to a lower value of usage information due to the dependency of the generalization factor to the usage information.

The usage information may be calculated based on data associated with the data element, which may be determined, and/or which may, for instance, be comprised in the data element. The data associated with the data element, for instance, can be comprised in a further database comprising such usage information. Furthermore, the usage information may be dependent on predefined criteria, for instance, specified based on certain parameters of importance.

In a further exemplary embodiment of all aspects of the aforementioned embodiment, the data associated with the data element comprises at least one of:
a representative of a number of links associated with the data element, and/or
a representative of a length of a link, and/or
a representative of a number of nodes associated with the data element, and/or
a representative of a number of inhabitants associated with the data element, and/or
a representative of a number of point-of-interests associated with the data element, and/or
a representative of importance of at least one road associated with the data element, and/or
an area identifier associated with the data element, and/or
traffic related usage information associated with the data element.

The data associated with the data element may be a certain parameter for determining the usage information.

Traffic related usage information may be indicative to a frequency of usage of a data element from at least one user of navigation data. Therefore, a data element being used more often by at least one user, for instance, because the data element represents a map region comprising a road, e.g. a highway, which is used very frequently, may have a higher frequency of usage than some rural road, contained in at least one map region of a different data element. An importance of at least one road associated with the data element may be reflected by functional road classes (FRC) or administrative road classes.

Commonly, it may be not known at the time of the generation of a new data element, how often a certain new data element to be generated may be used, for instance by being looked at an area respectively a map region of the data element by at least one user or a plurality of users. Further, an area respectively a map region of a new data element to be generated may be never used. Thus, a new data element to be generated representing at least one map region, which is never used by any user, may be generated with the lowest level of details possible. Furthermore, a new data element to be generated representing at least one map region, which is used very frequently, may be generated with the highest level of details possible to get a satisfactory user experience.

The usage information may depend on and/or may be determined based on at least one of (i) data associated with the data element, for instance, a representative of a number of links associated with the data element, and/or (ii) a representative of a length of a link, and/or (iii) a representative of a number of nodes associated with the data element, and/or (iv) a representative of a number of inhabitants associated with the data element, and/or (v) a representative of a number of point-of-interests associated with the data element, and/or (vi) a representative of importance of at least one road associated with the data element, and/or (vii) an area identifier associated with the data element, and/or (viii) traffic related usage information associated with the data element.

The usage information may be calculated, for instance by the processor, by the following formula:

$$U=f(\text{number of links, number of nodes}), \text{ or for instance by}$$

$$U=f(\text{sum}(\text{linklength}*FRC)).$$

The value U represents a value of usage information.

The calculation of the usage information may result in a good approximation to the actual frequency of usage of a new data element, considering the data associated with the data element.

A new data element representing at least one map region, comprising, for instance roads, parks, rivers, or the like, may be generated based on the adequate data element with a higher level of detail, therefore they may be depicted in higher precision. As an example, a new data element representing at least one map region, for instance a populated city, is generated with a higher level of details compared to a new data element representing at least one map region of some rural area.

Furthermore, data associated with the data element may be defined based on interests of the users of at least one new data element to be generated. For instance, navigation data comprising the map region of Europe, which may be sold in Germany, may be formed by a plurality of new data elements to be generated. A new data element to be generated representing at least one map region of Germany may be more important to a user, than a new data element representing another European country. Therefore, the usage information associated to the data element representing the at least one map region of Germany may be higher compared to the usage information associated to the data element representing some other European country. This will result in a higher generalization factor associated to the new data element to be generated representing at least one map region of Germany, than the generalization factor associated to the new data element to be generated representing some other European country.

According to an exemplary embodiment of all aspects of the present invention, usage information may be gathered, for instance, by receiving the usage information from a plurality of users of navigation data, and subsequent to the gathering of said usage information, analyzing, for instance by using the processor, the gathered usage information to determine the generalization factor based on the gathered usage information of the data element. Furthermore, the usage information may be gathered by using sharable data, which may be publically available, or users may have agreed upon sharing such data, which may be previously gathered and/or stored locally at an apparatus, e.g. terminal.

In an exemplary embodiment of all aspects of the two aforementioned embodiments, the traffic related usage information are obtained from at least one of:
  mobile devices, and/or
  cars, and/or
  traffic providers.

According to an exemplary embodiment of all aspects of the present invention, the generalization factor further depends on a zooming level, for example a predefined zooming level, associated with a map intended to comprise the new data element.

For instance, a higher zooming level may lead to more precise data of the new generated data element compared to a lower zooming level. Zooming levels are commonly divided into predefined levels, wherein each of the predefined levels may lead to different level of preciseness of data of the new generated data element. For instance, a data element associated with a zooming level of 10 may comprise more precise data than a data element associated with a zooming level of 4. A higher zooming level may result in a new data element to be generated representing a map region of smaller size, for instance, a zooming level of 8 may cover a map region, which is 16 times bigger than the map region covered by a new data element to be generated associated with a zooming level of 10. As a result of this, a new data element to be generated associated with a zooming level of 10 contains a level of details, which is 16 times more precise than the level of details of a new data element to be generated associated with a zooming level of 8.

Furthermore, because of the higher level of details of the new data element associated with the zooming level of 10, said new data element uses 16 times the amount of data than the data element associated with a zooming level of 8.

The generalization factor may be dependent on a usage information and a zooming level. Usage information may represent a value indicating an expected usage of a data element by at least one user. Zooming level may represent a certain level of details of the data element. For instance, a zooming level representing a zoomed-in view may have a predefined level of details, which level of details may not go below a definable threshold. The generalization factor depending on a certain usage information may be relatively higher when depending on a relatively higher zooming level compared to another generalization factor depending on the same certain usage information but further depending on a relatively lower zooming level. The relatively higher zooming level may represent a more zoomed-in view compared to a relatively lower zooming level, which may represent a more zoomed-out view. Depending on a usage information and a zooming level, a generalization factor may be determined, for instance, by multiplying the determined value of the usage information by the value of the zooming level. Further, the generalization factor may be dependent on at least one weighting factor of the usage information and/or at least one weighting factor of the zooming level resulting in assigning more significance to the usage information and/or to the zooming level depending on the assigned at least one weighting factor for the generalization factor. Further, there may be one weighting factor assigned to the usage information and a further weighting factor assigned to the zooming level. Thus, the generalization factor may be dependent on a usage information factorized with a weighting factor, and optionally dependent on a zooming level factorized with a further weighting factor.

According to an exemplary embodiment of all aspects of the invention, using the processor, a generalized database is compiled, the generalized database comprising a plurality of generated data elements, wherein the plurality of generated data elements represent navigation data, and each data element of the plurality of data elements represents at least one map region; and the compiled generalized database is stored in a memory.

Each generated data element may represent at least one map region, preferably wherein each at least one map region is unique so that no duplicate data is contained in the generalized database. At least one map region of a generated new data element may border on at least one map region of a further generated new data element. A plurality of generated new data elements may form a map.

At least two or each generated data element of the plurality of generated data elements may be generated with a different generalization factor. Therefore, at least one map region of one data element generated with a higher generalization factor may have a higher level of details and be more precise compared to at least one map region of one other data element generated with a relatively lower generalization factor, which may have a lower level of details and be less precise. Such a data element generated with a higher generalization factor may equal or be similar to the data element, based on which the new data element was generated. A new data element generated with lower generalization factor may be less precise than the data element, based on which the new data element was generated with the associated generalization factor.

As a result, the size of the compiled generalized database may be of smaller size than a database compiled of data elements, wherein each data element has the same level of details. At least one map region of a generated data element, which may not be of importance for a user, may require less size than at least one map region of a generated data element, which is used more frequently. The compiled generalized database may offer nearly the same user experience than the database compiled of data elements, wherein each data element has the same level of details, since the likelihood of a usage of data elements representing at least one map region of minor importance is very low. The data of the data element based on which the new data element is generated, may only be used in high precision if it is worth doing so. A compiled generalized database offers a better trade-off between the size of stored data and user experience.

Such a compiled generalized database may, for instance, be transferred in a shorter transmission time and/or require less bandwidth to transfer the generalized database to a terminal to be locally stored. Further, incremental update patches of navigation data may be of smaller size.

In a further exemplary embodiment of aspects of the aforementioned embodiment of the present invention, the generated new data element comprises data for different zooming levels.

For example, a generated new data element may represent at least one map region, and said new data element may comprise said at least one map region for different zooming levels. There may be, for instance, at least one zoomed-in view of said at least one map region, and one or more zoomed-out views of said at least one map region. Further, e.g. the at least one map region may consist of one or more tiles for the zoomed-in view, which form the at least one map region. For each different zooming level, a new data element may be generated with an associated generalization factor, wherein the generalization factor may be depending on a determined zooming level. Therefore, a generated new data element may comprise data for different zooming levels, wherein the data of the generated new data element may be associated with different generalization factors for each of said plurality of zooming levels of the generated new data element. Further, the data of different data elements may be associated with different generalization factors for each zooming level of a data element of said different data elements. When generating a new data element, for instance using the processor, the data for at least one zooming level of said new data element to be generated may be associated with a generalization factor, wherein the generalization factor may be different for data of a different zooming level of said new data element to be generated.

In a further exemplary embodiment of all aspects of the present invention, the processor generates the new data element using a Douglas-Peucker algorithm. For instance, using the processor, a new data element may be generated using the Douglas-Peucker algorithm, which may reduce the size of a data element, based on which the new data element is generated. The Douglas-Peucker algorithm approximates, for instance, the number of points of a polygon to find a similar polygon with fewer points. As a result, the polygon with fewer points is of smaller size than the polygon based on which it is calculated.

In a further exemplary embodiment of all aspects of the present invention, the data element comprises at least one of:
a representative of a polygon, and/or
a representative of a line, and/or
a representative of a point, and/or
a representative of a basic map display feature, and/or
a representative of a digital terrain model feature, and/or
a representative of a satellite image, and/or
a representative of an orthoimage, and/or
a representative of 2D data, and/or
a representative of 3D data, and/or
a representative of a junction view.

The data element may represent at least one map region, wherein the at least one map region may comprise (i) at least one representative of a polygon, or (ii) at least one representative of a line, or (iii) at least one representative of a point, or (iv) at least one representative of a basic map display feature, or (v) at least one representative of a digital terrain model feature, or (vi) at least one representative of a satellite image. Furthermore, the data element may comprise (vii) at least one representative of an orthoimage, or (viii) at least one representative of 2D data or (ix) at least one representative of 3D data, or (x) at least one representative of a junction view.

For instance, a generalization of a representative of a polygon, and/or a representative of a polygon line, by generating a new data element may be done by using a Douglas-Peucker algorithm.

Further, a generalization of a representative of a point by generating a new data element may be done by not using all bits possible for expressing an x- and a y-coordinate of a point included in the data element.

Generalization of a representative of a basic map display feature and/or a digital terrain model feature by generating a new data element may be done by varying the number of points used for a basic map display feature and/or a digital terrain model feature, or for a tile of at least one map region of a basic map display feature and/or a digital terrain model feature.

Regarding a representative of a satellite image of the data element, a generalization by generating a new data element may be done, for instance, by using different compression factors for the satellite image.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description of the invention as provided in the above summary section of this specification.

Figure 1:
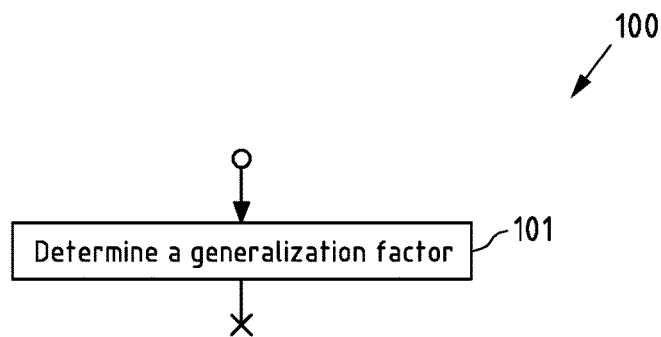
FIG. 1 is a flowchart showing an example embodiment of a method according to the first exemplary aspect of the present invention.

FIG. 1 is a flowchart 100 showing an example embodiment of a method according to the first exemplary aspect of the present invention. This flowchart 100 may for instance be performed by server 610 of FIG. 6.

In the step 101, a generalization factor is determined, e.g. by server 610 or by another apparatus, e.g. using a processor and a memory, configured to perform and/or control step 101. Step 101 may be, for instance, determining, using a processor, a generalization factor associated with a data element of a database comprising navigation data, the generalization factor depending on a usage information associated with the data element, wherein the generalization factor is indicative to a level of details of a new data element to be generated based on the data element.

Figure 6:
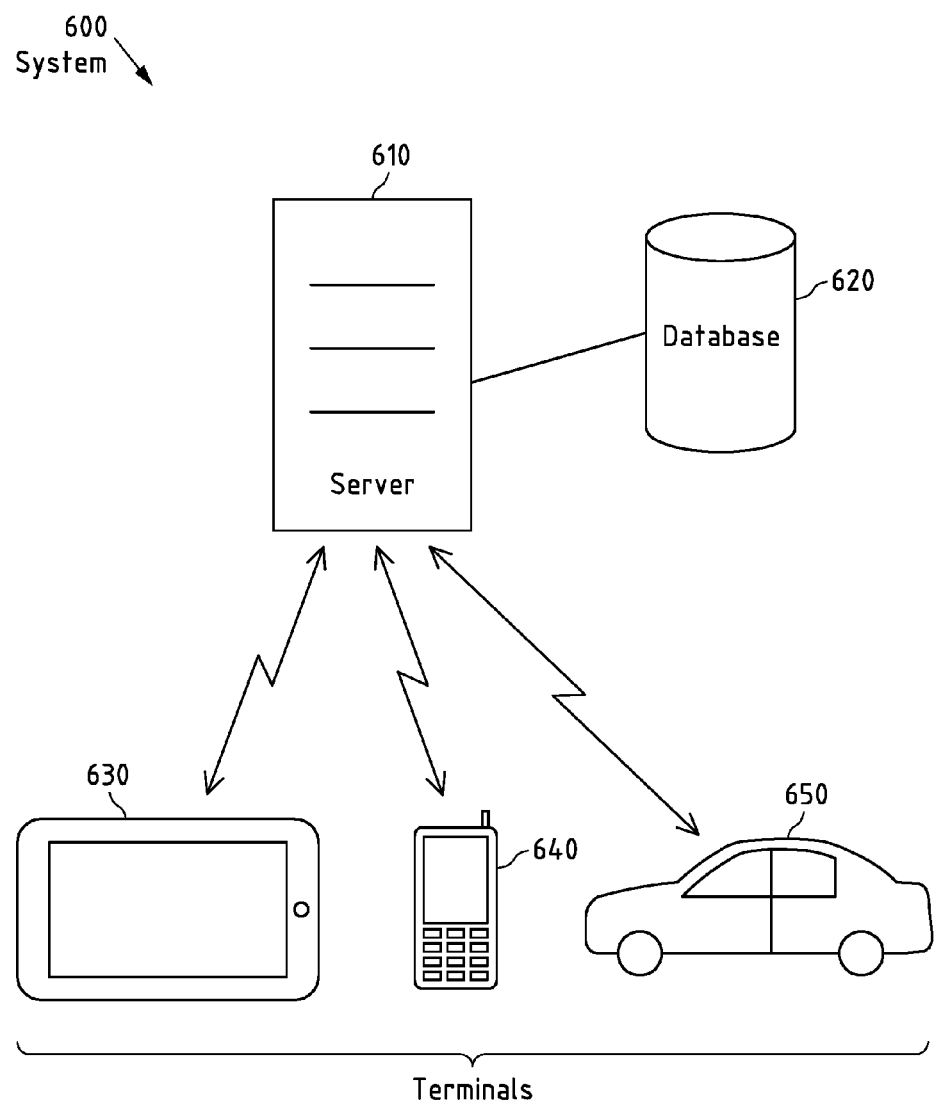
FIG. 6 is a schematic block diagram of a system according to an exemplary embodiment of the present invention.

The generalization factor may for instance be associated with a data element of a database, e.g. database 620 of FIG. 6, comprising navigation data. Further, the generalization factor may be dependent on a usage information associated with the data element, wherein the generalization factor is indicative to a level of details of a new data element to be generated based on the data element.

In an example, a higher generalization factor results in generating the new data element with a relatively higher level of details compared to a lower generalization factor, which results in generating the new data element with a relatively lower level of details. The level of details may result in that data of the new data element is more precise, or that data of the new data element to be generated when using a relatively lower generalization factor is less precise.

In an exemplarily embodiment, the database comprising navigation data may comprise one or more data elements. A data element may represent at least one map region. A data element may comprise at least one of a representative of a polygon, or a representative of a line, or a representative of a point, or a representative of a basic map display feature, or a representative of a digital terrain model feature, or a representative of a satellite image, or a representative of an orthoimage, or a representative of 2D data or 3D data, or a representative of a junction view.

In this way, navigation data may consist of many kinds of different data, in particular of at least one of the aforementioned representatives, or a combination thereof.

In an example, the generalization factor is dependent on a usage information associated with the data element. In one example approach, a usage information may give an indication to the likelihood and/or frequency that a certain data element of the database comprising navigation data is used, e.g. by at least one user. Data associated with the data element may comprise valuable information for an indication to determine the usage information.

In an example, the generalization factor may depend on a zooming level associated with at least one map region intended to comprise the new data element. In this way, a generalization factor associated with a data element may differ from a further generalization factor associated to said data element for a different associated zooming level. For instance, a data element representing at least one map region may at a certain zooming level for instance be of less interest for a user so that data associated with the data element may comprise less level of details. Further, data associated with said data element, which is for instance of relatively higher interest for a user may comprise a higher level of details, and may therefore be more precise.

Figure 2:
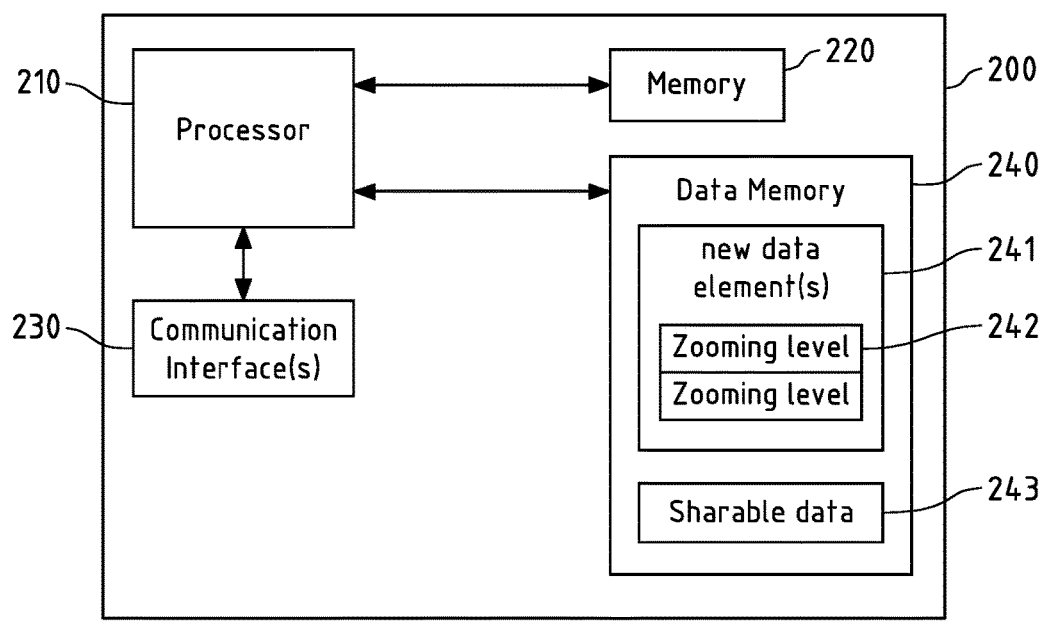
FIG. 2 is a schematic block diagram of an apparatus according to an exemplary aspect of the present invention, for instance performed by at least one terminal, e.g. terminal 630, 640, and/or 640 of FIG. 6.

FIG. 2 is a schematic block diagram of an apparatus according to an exemplary aspect of the present invention, for instance performed by at least one terminal 630, 640, and/or 640 of FIG. 6.

Apparatus 200 comprises a processor 210, memory 220, communication interface(s) 230, and data memory 240.

Apparatus 200 may for instance be configured to perform and/or control or comprise respective means (at least one of 210 to 240) for performing and/or controlling the method according to exemplary aspects of the invention. Apparatus 200 may as well constitute an apparatus comprising at least one processor 210 and at least one memory 220, 240 including computer program code, the at least one memory and the computer program code configured to, with the at least one processor, cause an apparatus, e.g. apparatus 200 at least to perform and/or control the method according to exemplary aspects of the invention.

Processor 210 may for instance execute computer program code stored in memory 220, which may for instance represent a computer readable storage medium comprising program code that, when executed by processor 210, causes the processor 210 to perform the method according to the exemplary aspects of the invention.

Processor 210 (and also any other processor mentioned in this specification) may be a processor of any suitable type. Processor 210 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 210 may for instance be an application processor that runs an operating system.

Memory 220 may also be included into processor 210. This memory may for instance be fixedly connected to processor 210, or be at least partially removable from processor 210, for instance in the form of a memory card or stick. Memory 220 may for instance be non-volatile memory. It may for instance be a FLASH memory (or a part thereof), any of a ROM, PROM, EPROM and EEPROM memory (or a part thereof) or a hard disc (or a part thereof), to name but a few examples. Memory 220 may also comprise an operating system for processor 210. Memory 220 may also comprise a firmware for apparatus 200.

Data memory 240 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 240 may for instance store one or more data elements and/or new data elements, as well as sharable data. Data memory 240 may for instance comprise a plurality of data elements, which represent navigation data. Each new data element stored in data memory 240 may for instance represent at least one map region. Further, each at least one map region of a new data element may border to another at least one map region of a further new data element. Each data element stored at data memory 240 may comprise one or more zooming levels. There may be, for instance, at least one zoomed-in view of at least one map region of the new data element, and at least one zoomed-out view of said at least one map region of the new data element.

Figure 5:
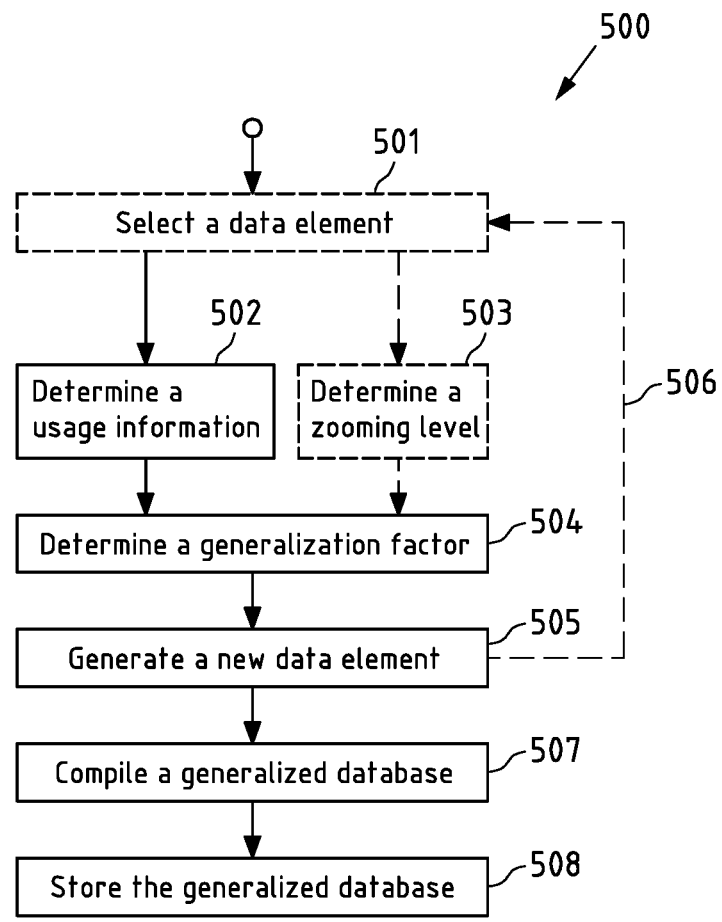
FIG. 5 is a flowchart showing an example embodiment of a method according to an exemplary aspect of the present invention.

The sharable data of data memory 240 may for instance be used for determining a usage information, e.g. step 502 of FIG. 5.

Communication interface(s) 230 enable apparatus 200 to communicate with other entities, e.g. with server 610 of FIG. 6. The communication interface(s) 230 may for instance comprise a wireless interface, e.g. a cellular radio communication interface and/or a WLAN interface) and/or wire-bound interface, e.g. an IP-based interface, for instance to communicate with entities via the internet. Communication interface(s) may enable apparatus 200 to communicate with other entities, for instance with server 610 of FIG. 6 for the transmission of at least one or more data elements to be stored locally at data memory 240.

Some or all of the components of the apparatus 200 may for instance be connected via a bus. Some or all of the components of the apparatus 200 may for instance be combined into one or more modules.

Figure 3:
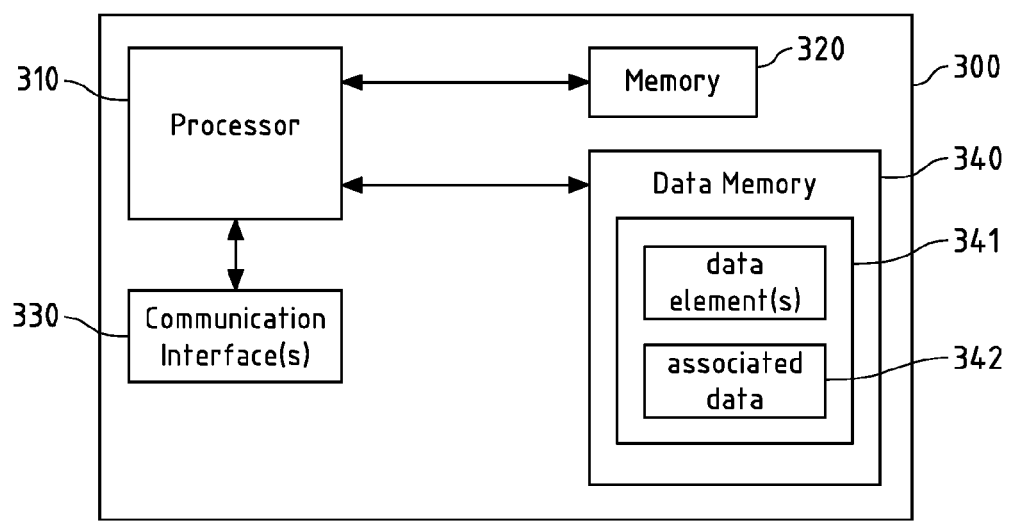
FIG. 3 is a schematic block diagram of an apparatus according to an exemplary aspect of the present invention, for instance performed by at least one server, e.g. server 610 of FIG. 6.

FIG. 3 is a schematic block diagram of an apparatus 300 according to an exemplary aspect of the present invention, for instance performed by at least one server 610 of FIG. 6. Further, apparatus 300 may be configured to perform and/or control the flowchart 100 of FIG. 1, 400 of FIG. 4 and/or 500 of FIG. 5.

Apparatus 300 comprises a processor 310, memory 320, communication interface(s) 330, and data memory 340.

Apparatus 300 may for instance be configured to perform and/or control or comprise respective means (at least one of 310 to 340) for performing and/or controlling the method according to exemplary aspects of the invention. Apparatus 300 may as well constitute an apparatus comprising at least one processor 310 and at least one memory 320, 340 including computer program code, the at least one memory and the computer program code configured to, with the at least one processor, cause an apparatus, e.g. apparatus 300 at least to perform and/or control the method according to exemplary aspects of the invention.

Processor 310 may for instance execute computer program code stored in memory 320, which may for instance represent a computer readable storage medium comprising program code that, when executed by processor 310 causes the processor 310 to perform the method according to the exemplary aspects of the invention.

Processor 310 may be a processor of any suitable type, in particular of any type described above relating to processor 210 of FIG. 2.

Memory 320 may also be included into processor 310. This memory may for instance be fixedly connected to processor 310, or be at least partially removable from processor 310, for instance in the form of a memory card or stick. Memory 320 may for instance be non-volatile memory. It may for instance be a FLASH memory (or a part thereof), any of a ROM, PROM, EPROM and EEPROM memory (or a part thereof) or a hard disc (or a part thereof), to name but a few examples. Memory 320 may also comprise an operating system for processor 310. Memory 320 may also comprise a firmware for apparatus 300.

Data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store one or more data elements and/or new data elements, as well as to the one or more data elements and/or new data elements associated data.

A data element stored in data memory 340 may for instance represent at least one map region with a very high level of details and/or a level of details equal or similar to raw data. A data element stored in data memory 340 of apparatus 300, e.g. server 610 of FIG. 6, is used for generating a new data element, wherein the data element is generalized in order to reduce its size. A data element may form the basis for generating a new data element, e.g. performed by step 505 of FIG. 5 and therefore may have a very high, in particular the highest possible level of details, when associated with an appropriate generalization factor.

Communication interface(s) 330 enable apparatus 300 to communicate with other entities, e.g. with terminal 630, 640, 650 of FIG. 6. The communication interface(s) 330 may for instance comprise a wireless interface, e.g. a cellular radio communication interface and/or a WLAN interface) and/or wire-bound interface, e.g. an IP-based interface, for instance to communicate with entities via the internet.

Some or all of the components of the apparatus 300 may for instance be connected via a bus. Some or all of the components of the apparatus 300 may for instance be combined into one or more modules.

Figure 4:
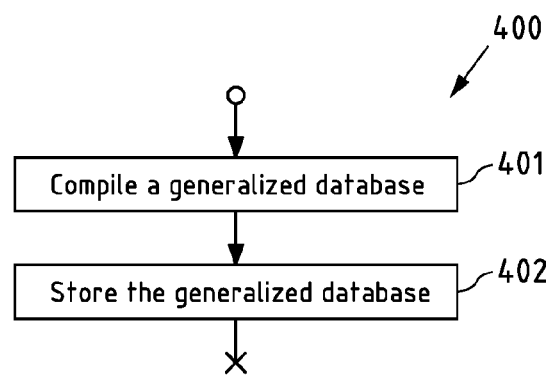
FIG. 4 is a flowchart showing an example embodiment of a method according to an exemplary aspect of the present invention.

FIG. 4 is a flowchart showing an example embodiment of a method according to an exemplary aspect of the present invention.

In the step 401, a generalized database is compiled, using a processor, e.g. processor 310 of FIG. 3. The generalized database may comprise, in one or more, in particular a plurality of generated new data elements, for instance new data elements 241 of FIG. 2. The plurality of generated new data elements represent navigation data, and each data element of the plurality of data elements represents at least one map region. Each new data element of said plurality of new data elements may be generated with a different generalization factor.

In this way, the size of a generated new data element can be varied. A new data element may be generated, based on a data element representing at least one map region, wherein said data element represents at least one map region with a lower likelihood and/or frequency of usage, with a lower level of details, resulting in a smaller size of the new data element. The size of the generated new data element may be smaller than a generated data element of a database consisting of one or more data elements generated with a static generalization factor. Further, a new data element may be generated, based on a data element representing at least one map region, wherein said data element represents at least one map region with a higher likelihood and/or frequency of usage, with a higher level of details, resulting in a larger size of the new data element. One known approach is that a database consists of one or more data elements generated with a static generalization factor. The size of the database with data elements generated with a static generalization factor may be larger than a generated data element of data elements, wherein each data element is generated with an individual generalization factor. As a result, a database compiled with one or more data elements, wherein each data element is generated with a generalization factor depending on usage information associated with the data element, may have a higher level of details in at least one map region of a data element, which is frequently used, but still be of smaller size compared to the database consisting of one or more data elements generated with a static generalization factor, for instance a static generalization factor at a certain zooming level. Therefore, a generalized database comprising one or more new data elements generated with a generalization factor depending on usage information associated with the data element may offer a better trade-off between the size of stored data and user experience than the static level-based generalization approach.

In step 402, the generalized database is stored in a memory, e.g. data memory 240 of FIG. 2, and/or data memory 340 of FIG. 3. When the generalized database is stored in data memory 340, for using the generalized database, it has to be transferred to an apparatus, e.g. terminal 630, 640, 650 of FIG. 6.

FIG. 5 is a flowchart showing an example embodiment of a method according to an exemplary aspect of the present invention.

In optional step 501, a data element may be selected. The data element may for instance be selected out of a database comprising navigation data, e.g. database 620 of FIG. 6. The database comprising navigation data may be stored in a memory, for instance data memory 340 of FIG. 3. The selected data element may be used for a new data element to be generated at step 505.

In step 502, a usage information is determined. Determining the usage information is based on data associated with the data element, wherein the data element represents at least one map region. The usage information may for instance be determined, using a processor, e.g. processor 310 of FIG. 3, by determining a number of links associated with the data element. For instance, the number of links contained in a data element may give an indication to the likelihood and/or frequency of usage of said data element. A high number of links associated to a data element may be an indication to a higher likelihood and/or frequency of usage, compared to a relatively lower number of links associated to a further data element. By comparing, using a processor, e.g. processor 310 of FIG. 3 and at least one memory, e.g. data memory 340 of FIG. 3, for storing at least temporarily information, such data associated to a data element to data associated to a further data element, the usage information may be determined.

Further, for instance data associated to a data element for determining the usage information may be a number of nodes associated with the data element, or a number of inhabitants associated with the data element, or a number of point-of-interests associated with the data element, or an importance of at least one road associated with the data element, or an area identifier associated with the data element, or traffic related usage information associated with the data element.

In a further exemplarily embodiment of the aforementioned aspects of the present invention, traffic related usage information may be obtained from at least one of mobile devices, or cars, or traffic providers. Subsequently, the traffic related usage information may for instance be stored at data memory 240 as sharable data 243. The traffic related usage information may be transmitted from an apparatus, for instance terminal 630, 640, 650 of FIG. 6, to an apparatus, for instance server 610 of FIG. 6. The transmission of said traffic related usage information may for instance occur by using communication interface(s) 230 of FIG. 2 and communication interface(s) 330 of FIG. 3 for a communication between terminal 630, 640, 650 of FIG. 6 and server 610 of FIG. 6. For instance, a relatively higher traffic volume occurring in at least one map region of a data element, may be an indication to a relatively higher likelihood and/or frequency of usage of said data element. In this way, a usage information can as well be determined at step 502 based on traffic related usage information associated to the data element, and which traffic related usage information may be obtained, e.g. in the aforementioned described way, by one or more terminals, e.g. terminal 630, 640, 650 of FIG. 6.

In step 503, an optional zooming level is determined. A new data element to be generated at step 505 may comprise data for different zooming levels. For example, a generated new data element may represent at least one map region, and said new data element may comprise said at least one map region for different zooming levels. There may be, for instance, at least one zoomed-in view of said at least one map region, and one or more zoomed-out views of said at least one map region. For each different zooming level, a new data element may be generated at step 505 with an associated generalization factor, wherein the generalization factor is dependent on a determined zooming level. Therefore, a new data element to be generated may comprise data for a plurality of different zooming levels, wherein the data for each of said plurality of zooming levels may be associated with a different generalization factor caused by an optional dependency of the generalization factor on the determined zooming level. When generating the new data element at step 505, for instance using processor, e.g. processor 310 of FIG. 3, the data for at least one zooming level of said new data element to be generated may be associated with a generalization factor, wherein the generalization factor may be different for data of a different zooming level of said new data element.

In step 504, a generalization factor is determined, e.g. the same way as step 101 of FIG. 1. Using a processor, a generalization factor is determined that is associated with a data element of a database comprising navigation data. The generalization factor depends on a usage information associated with the data element, and the generalization factor is indicative to a level of details of a new data element to be generated based on the data element. Depending on the usage information determined at step 502, and optionally depending on the zooming level determined at step 503, the generalization factor can be determined, using a processor, e.g. processor 310 of FIG. 3.

In step 505, a new data element is generated. In an example, the generation of a new data element is done by rendering data comprised by a data element under consideration of the generalization factor associated to said data element. Optionally, a zooming level associated with at least one map region of said data element intended to comprise the new data element is considered. For efficient rendering, for instance rendering at least one representative ((i) polygon, (ii) line, (iii) point, (iv) basic map display feature, (v) digital terrain model feature, (vi) satellite image, (vii) orthoimage, (viii) 2D data, (ix) 3D data, (x) junction view) data associated with the data element, the data element may comprise data, e.g. at least one of the aforementioned representatives for different zooming levels. For example, at least one map region of a data element may be rendered at one or more zooming levels, wherein a rendered representative of a lower zooming level appears to show a smaller part of the at least one map region. Further, a lower zooming level comprises more details of the at least one map region. In contrast, a higher zooming level results in a rendered representative of a larger part of the at least one region. The higher the zooming level is, the larger is the part of the at least one map region in terms of spatial size. A higher zooming level does not need to have all details available, and may therefore have reduced level of detail. For instance, using an algorithm, the level of details of a data element can be reduced, e.g. by using the aforementioned Douglas-Peucker algorithm. The determined generalization factor is indicative to a level of details of a new data element to be generated based on the data element.

Recursion step 506 may be optional and indicates that steps 501 to 505 may be optionally repeated once or more than once for one or more one data elements to be generated. At least one or more new data elements can be generated. Further, the steps 501 to 505 can be executed in parallel by using two or more processors, e.g. by using a server cloud consisting of at least two servers, each server having a processer and at least one memory.

If all required data elements are generated, or at least one data element is generated, the one or more generated data elements are compiled into a generalized database at step 507, using a processor, e.g. processor 310 of FIG. 3.

In step 508, the generalized database is stored in a memory, e.g. data memory 340 of FIG. 3, or data memory 240 of FIG. 2. If the generalized database is stored in memory 340 of FIG. 3, the generalized database may be shared and/or provided as a service for instance to a terminal, e.g. terminal 630, 640, 650 of FIG. 6. Upon reception of the generalized database, the generalized database may be stored locally in data memory, e.g. data memory 240 of FIG. 2 for further usage by the terminal. Further, a compiled generalized database update patch may be shared to a terminal, e.g. terminal 630, 640, 650 of FIG. 6. The update patch may for instance be an incremental update patch, replacing at least one data element of an already existent database, for instance stored locally at terminal 630, 640, 650.

Communication interface(s) 330 of FIG. 3 and 230 of FIG. 2 may be used for the transmission of a compiled generalized database and/or a compiled generalized database update patch between an apparatus comprising or having access to the compiled generalized database and/or the compiled generalized database update patch, e.g. server 610 of FIG. 6, and a further apparatus, e.g. terminal 630, 640, 650 of FIG. 6.

FIG. 6 is a schematic block diagram of a system according to an exemplary embodiment of the present invention. System 600 comprises a server 610, which may alternatively be embodied as a server cloud (e.g. a plurality of servers connected e.g. via the internet and providing servers at least partially jointly), a database 620, which may be connected to the server e.g. via the internet and allowing access from the server 610 to data of the database 620, alternatively the database 620 may be embodied e.g. in the server 610, and a terminal 630, 640, 650, of which three different realizations are shown as an example: a portable navigation device 630, a mobile device 640 and a car 650.

According to an example embodiment of the present invention, terminal 630, 640, 650 may store a generalized database provided by server 610. Communication, e.g. for the transmission of generalized database and/or at least one incremental update patch for a generalized database stored locally at terminal 630, 640, 50, between server 610 and terminal 630, 640, 650 may for instance take place at least partially in a wireless function, e.g. based on cellular radio communication or on Wireless Local Area Network (WLAN) based communication, to name but a few examples. A generalized database may represent navigation data by comprising at least one data element representing at least one map region. The terminal may be configured to receive at least one new data element. At least one data element and/or a generalized database may be stored in database 620, and may be provided to terminal 630, 640, 650 via server 610. In this way, e.g. incremental map update patches and/or navigation data may is provided, for instance as a service, to terminal(s) of user(s).

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:
1. A method, comprising:
   determining, using a processor, a generalization factor associated with a data element of a database comprising navigation data, the generalization factor depending on usage information associated with the data element, wherein the generalization factor is indicative of a level of details of a new data element to be generated based on the data element; and generating the new data element based on the data element and the generalization factor wherein a lower generalization factor results in generating the new data element with a relatively lower level of detail than the new data element generated in response to a higher generalization factor.

2. The method according to claim 1, wherein the higher generalization factor results in generating the new data element with a relatively higher level of detail.

3. The method according to claim 1, further comprising:
determining the usage information based on data associated with the data element, wherein the data element represents at least one map region.

4. The method according to claim 3, wherein said data associated with the data element represents data being indicative of a likelihood of usage of the data element.

5. The method according to claim 3, wherein the data associated with the data element comprises at least one of:
a representative of a number of links associated with the data element, and/or
a representative of a number of nodes associated with the data element, and/or
a representative of a number of inhabitants associated with the data element, and/or
a representative of a number of point-of-interests associated with the data element, and/or
a representative of importance of at least one road associated with the data element, and/or
an area identifier associated with the data element, and/or
traffic related usage information associated with the data element.

6. The method according to claim 5, wherein the traffic related usage information are obtained from at least one of:
mobile devices, and/or
cars, and/or
traffic providers.

7. The method according to claim 1, wherein the generalization factor further depends on a zooming level associated with at least one map region intended to comprise the new data element.

8. The method according to claim 1, further comprising:
compiling, using the processor, a generalized database comprising a plurality of generated data elements, wherein the plurality of generated data elements represent navigation data, and each data element of the plurality of data elements represents at least one map region; and
storing, in a memory, the compiled generalized database.

9. The method according to claim 8, wherein the generated new data element comprises data for different zooming levels.

10. The method according to claim 1, wherein the processor generates the new data element using a Douglas-Peucker algorithm.

11. The method according to claim 1, wherein the data element comprises at least one of:
a representative of a polygon, and/or
a representative of a line, and/or
a representative of a point, and/or
a representative of a basic map display feature, and/or
a representative of a digital terrain model feature, and/or
a representative of a satellite image, and/or
a representative of an orthoimage, and/or
a representative of 2D data, and/or
a representative of 3D data, and/or
a representative of a junction view.

12. An apparatus comprising at least one processor and at least one memory including computer program code for one or more programs; the at least one memory and the computer program code configured to, with the at least one processor, cause the apparatus to at least:
determine a generalization factor associated with a data element of a database comprising navigation data, the generalization factor depending on usage information associated with the data element, wherein the generalization factor is indicative of a level of details of a new data element to be generated based on the data element; and
generate the new data element based on the data element and the generalization factor wherein a lower generalization factor results in generating the new data element with a relatively lower level of detail than the new data element generated in response to a higher generalization factor.

13. The apparatus according to claim 12, wherein the higher generalization factor results in generating the new data element with a relatively higher level of detail.

14. The apparatus according to claim 12, wherein the at least one memory and the computer program code are further configured to, with the at least one processor, cause the apparatus to:
determine the usage information based on data associated with the data element, wherein the data element represents at least one map region.

15. The apparatus according to claim 14, wherein said data associated with the data element represents data being indicative of a likelihood of usage of the data element.

16. The apparatus according to claim 12, wherein the generalization factor further depends on a zooming level associated with at least one map region intended to comprise the new data element.

17. The apparatus according to claim 12, wherein the at least one memory and the computer program code are further configured to, with the at least one processor, cause the apparatus to:
compile a generalized database comprising a plurality of generated data elements, wherein the plurality of generated data elements represent navigation data, and each data element of the plurality of data elements represents at least one map region; and
store the compiled generalized database.

18. The apparatus according to claim 12, wherein the generated new data element comprises data for different zooming levels.

19. The apparatus according to claim 12, wherein the new data element is generated using a Douglas-Peucker algorithm.

20. A non-transitory computer readable storage medium including one or more sequences of one or more instructions which, when executed by one or more processors, cause an apparatus to at least perform:
determining a generalization factor associated with a data element of a database comprising navigation data, the generalization factor depending on usage information associated with the data element, wherein the generalization factor is indicative of a level of details of a new data element to be generated based on the data element; and generating the new data element based on the data element and the generalization factor wherein a lower generalization factor results in generating the new data element with a relatively lower level of detail than the new data element generated in response to a higher generalization factor.

\* \* \* \* \*